US010439957B1

United States Patent
Krottapalli et al.

(10) Patent No.: US 10,439,957 B1
(45) Date of Patent: *Oct. 8, 2019

(54) TENANT-BASED MANAGEMENT SYSTEM AND METHOD FOR DISTRIBUTED COMPUTING ENVIRONMENTS

(71) Applicant: VCE IP Holding Company LLC, Richardson, TX (US)

(72) Inventors: Praphul Krottapalli, Cary, NC (US); Venkatesh S. Madhipatla, Westford, MA (US); Sanjay Basu, Frisco, TX (US)

(73) Assignee: VCE IP Holding Company LLC, Richardson, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/918,925

(22) Filed: Mar. 12, 2018

Related U.S. Application Data

(63) Continuation of application No. 14/587,847, filed on Dec. 31, 2014, now Pat. No. 9,929,969.

(51) Int. Cl.
*G06F 15/16* (2006.01)
*H04L 12/911* (2013.01)
*H04L 29/06* (2006.01)
*H04L 29/08* (2006.01)

(52) U.S. Cl.
CPC .............. *H04L 47/70* (2013.01); *H04L 29/06* (2013.01); *H04L 29/08* (2013.01)

(58) Field of Classification Search
CPC .......... H04L 47/70; H04L 29/06; H04L 29/08
USPC .......................................................... 709/226
See application file for complete search history.

(56) References Cited

U.S. PATENT DOCUMENTS

| | | | | |
|---|---|---|---|---|
| 5,574,934 | A * | 11/1996 | Mirashrafi | G06Q 10/10 348/E7.082 |
| 7,269,701 | B2 * | 9/2007 | Shackelford | G06F 11/2069 711/112 |
| 7,463,648 | B1 * | 12/2008 | Eppstein | G06F 9/5011 370/468 |
| 8,650,299 | B1 | 2/2014 | Huang et al. | |
| 9,112,777 | B1 * | 8/2015 | Barclay | H04L 41/0803 |
| 9,519,441 | B1 * | 12/2016 | Smith | G06F 3/067 |
| 9,612,932 | B2 * | 4/2017 | Joshi | G06F 8/65 |
| 9,880,824 | B2 * | 1/2018 | Lewallen | G06F 8/61 |
| 9,929,969 | B1 * | 3/2018 | Krottapalli | H04L 47/70 |
| 9,942,114 | B1 * | 4/2018 | Arora | G06F 11/30 |
| 2002/0044633 | A1 * | 4/2002 | Nabha | H04L 29/06 379/90.01 |
| 2003/0004950 | A1 * | 1/2003 | Wils | H04L 29/06 |
| 2003/0193955 | A1 * | 10/2003 | Beshai | H04J 14/0227 370/395.4 |

(Continued)

*Primary Examiner* — David R Lazaro
*Assistant Examiner* — Berhanu Shitayewoldetadik
(74) *Attorney, Agent, or Firm* — Polsinelli PC

(57) ABSTRACT

A tenant-based distributed computing environment management system includes a service that is executed on a computing system to allocate a subset of the resources for use by each of a plurality of tenants, and generate a plurality of tags for each resource in the subset in which each tag includes tenant information associated with the tenant to whom the subset of resources are allocated. The service may then identify, for at least one of the tenants, the subset of resources allocated to the tenant, and transmit information associated with the identified subset of resources to a computing device of the tenant.

20 Claims, 8 Drawing Sheets

(56) References Cited

U.S. PATENT DOCUMENTS

| | | | |
|---|---|---|---|
| 2004/0044769 A1* | 3/2004 | Tanaka | G06F 9/5027 709/226 |
| 2005/0262509 A1* | 11/2005 | Kelly | G06F 9/5061 718/104 |
| 2006/0092841 A1* | 5/2006 | Lloyd | H04L 43/00 370/231 |
| 2007/0156650 A1 | 7/2007 | Becker | |
| 2008/0133211 A1* | 6/2008 | Dombrowski | G06Q 30/06 703/22 |
| 2008/0209179 A1 | 8/2008 | Barsness et al. | |
| 2008/0222289 A1* | 9/2008 | Conway | G06Q 10/06 709/225 |
| 2010/0120359 A1* | 5/2010 | Agarwal | H04B 7/18539 455/12.1 |
| 2010/0161922 A1* | 6/2010 | Sharp | G06F 9/45558 711/162 |
| 2010/0332646 A1* | 12/2010 | Balasubramanian | G06F 9/5016 709/224 |
| 2013/0179574 A1* | 7/2013 | Calder | G06F 9/5033 709/226 |
| 2013/0218874 A1 | 8/2013 | Liggett et al. | |
| 2013/0246334 A1* | 9/2013 | Ahuja | H04L 63/20 707/600 |
| 2014/0115598 A1* | 4/2014 | Matousek | G06F 9/5061 718/104 |
| 2014/0280247 A1 | 9/2014 | Pingenot et al. | |
| 2015/0200941 A1* | 7/2015 | Muppidi | H04L 41/28 726/1 |
| 2015/0244765 A1* | 8/2015 | Bellessort | H04L 67/322 709/203 |
| 2016/0266930 A1* | 9/2016 | Jones | G06Q 10/06311 |

\* cited by examiner

| TENANT | PROJECT | RESOURCE | NODE | LOCATION | COMPLIANCE LEVEL | MEMORY | MIPS | IOPS | $$ |
|---|---|---|---|---|---|---|---|---|---|
| ABC CORP | VENTURE ONE | COMP1-512K | VBLOCK3 | ATLANTA | PCI | 20G | 3.2 | 10GB/S | $10/M |
| ABC CORP | VENTURE ONE | COMP1-234L | VBLOCK3 | ATLANTA | PCI | 10G | 1.7 | 10GB/S | $8/M |
| ABC CORP | VENTURE TWO | COMP7-892 | VBLOCK11 | HOUSTON | | 10G | 6.7 | 50GB/S | $2.3/M |
| ACME LTD | PROVE IN TEST1 | DB1-897Q | VBLOCK3 | ATLANTA | PCI | 20G | 3.2 | 10GB/S | $10/M |
| ACME LTD | PROVE IN TEST1 | COMP1-114K | VBLOCK11 | HOUSTON | | 5G | 0.5 | 4GB/S | $2/M |
| ACME LTD | PROVE IN TEST1 | NTWK3-567 | VBLOCK3 | ATLANTA | PCI | 20G | 3.2 | 10GB/S | $16/M |
| ... | | ... | | | | | | | |
| ACME LTD | PROVE IN TEST1 | DB4-222 | VBLOCK11 | HOUSTON | | 5G | 6.2 | 50GB/S | $7/M |

FIG. 1B

TENANT-BASED MANAGEMENT SYSTEM AND METHOD FOR DISTRIBUTED COMPUTING ENVIRONMENTS

CROSS-REFERENCE TO RELATED APPLICATION

This continuation application is related to and claims priority to U.S. patent application Ser. No. 14/587,847, filed Dec. 31, 2014 entitled "TENANT-BASED MANAGEMENT SYSTEM AND METHOD FOR DISTRIBUTED COMPUTING ENVIRONMENTS," the entire contents of which is incorporated herein by reference for all purposes.

TECHNICAL FIELD

Aspects of the present disclosure relate to computing devices and, in particular, to a tenant-based management system and method for distributed computing environments.

BACKGROUND

Computing environments used by enterprises, such as corporations and universities, are often provided by multiple computing devices that function in a collaborative manner to meet the computing resource needs of the enterprise. With increased needs for stable computing environments, computing environments, such as converged infrastructures, were introduced that provided a standardized package of components that were combined into a single, optimized computing solution. Current trends in the computing industry have evolved to provide cloud computing environments in which computing resources are leased, rather than purchased by consumers (e.g., tenants) for various reasons that may include providing enhanced economies of scale.

SUMMARY

According to one aspect of the present disclosure, a tenant-based distributed computing environment management system includes a service that is executed on a computing system to allocate a subset of the resources for use by each of a plurality of tenants, and generate a plurality of tags for each resource in the subset in which each tag includes tenant information associated with the tenant to whom the subset of resources are allocated. The service may then identify, for at least one of the tenants, the subset of resources allocated to the tenant, and transmit information associated with the identified subset of resources to a computing device of the tenant.

BRIEF DESCRIPTION OF THE DRAWINGS

The various features and advantages of the technology of the present disclosure will be apparent from the following description of particular embodiments of those technologies, as illustrated in the accompanying drawings. It should be noted that the drawings are not necessarily to scale; however the emphasis instead is being placed on illustrating the principles of the technological concepts. Also, in the drawings the like reference characters refer to the same parts throughout the different views. The drawings depict only typical embodiments of the present disclosure and, therefore, are not to be considered limiting in scope.

FIG. 1B illustrates an example data source that may be used with the tenant-based distributed computing environment management system according to one embodiment of the present disclosure.

DETAILED DESCRIPTION

Embodiments of the present disclosure provide a tenant-based management system for a distributed computing environment in which tags are generated and maintained for each resource of the distributed computing environment such that subsets (e.g., groups) of resources allocated to each tenant may be easily identified. Current distributed computing environments often have more than 100,000 managed resources (e.g., virtual machines, servers, network switches, firewalls, load balancers, storage arrays, etc.). In many cases, each tenant may use a small subset of these resources (e.g., approximately 10 to 200 resources) that may be distributed throughout the distributed computing environment. Nevertheless, management of this relatively smaller group of resources may be difficult to accomplish when the resources allocated to each tenant may be randomly distributed over the relatively large number of resources of a distributed computing environment. Embodiments of the present disclosure provide a solution to this problem, among other problems, by tagging each resource in a distributed computing environment with tenant information so that each resource allocated to a particular tenant may be uniquely identified in an efficient and easy to use manner.

Although conventional distributed computing environment management systems may manage the operation and/or configuration of resources, they are often limited to managing resources of the distributed computing environment according to individual sub-systems of the distributed computing environment (e.g., storage sub-systems, network sub-systems, and compute sub-systems); however, they are not easily adapted to the management of resources according to a particular tenant to whom a certain subset of resources may be allocated. These conventional systems usually allocate resources for tenants at a physical layer (e.g., servers, storage devices, virtual data movers, switch ports, etc.) or a logical layer (e.g., hosts, datastores, virtual networking objects, etc.). Most of the configuration operations to achieve this are often performed before the resources may be made available for use by the tenant. Nevertheless, modification to a tenant's configuration, such as the addition and/or deletion of resources and modifications to one or more resources are often relatively difficult to accomplish when implemented in an environment having multiple tenants each having different performance requirements for the resources that execute their applications.

Figure 1A:
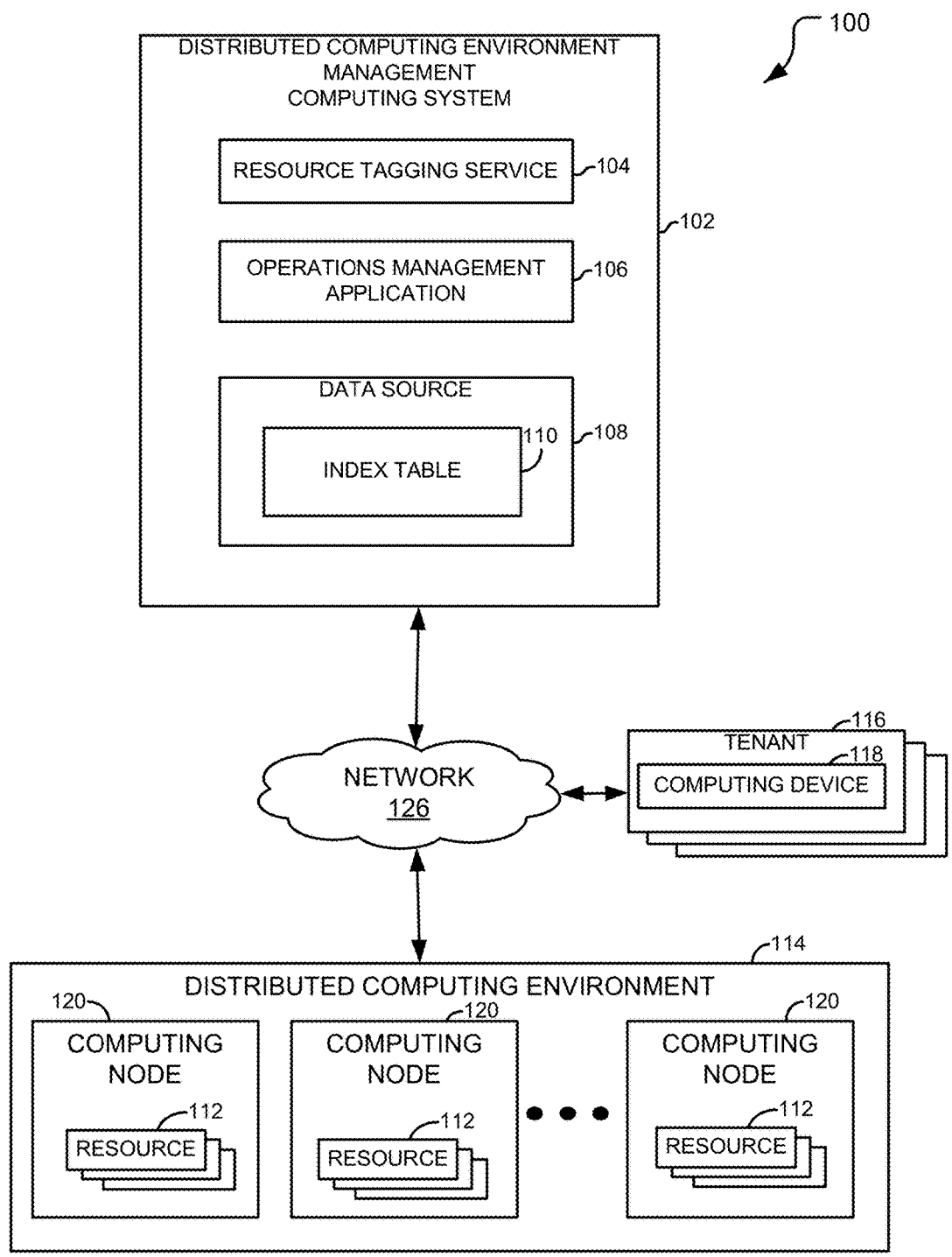
FIG. 1A illustrates an example tenant-based distributed computing environment management system according to one embodiment of the present disclosure.

FIG. 1 illustrates an example distributed computing environment management system 100 according to the teachings of the present disclosure. The system 100 includes a distributed computing environment management computing system 102 having a resource tagging service 104, an operations management application 106, and a data source 108 for storing an index table 110 that associates the resources 112 of a distributed computing environment 114 with each of multiple tenants 116 to whom the resources 112 are allocated. The resource tagging service 104 generates and maintains the index table 110, which is used by the operations management application 106 for performing various management tasks associated with operation of the distributed computing environment 114.

In most cases, the resources 112 generally refer to computing devices that perform some function for the overall operation of the distributed computing environment 114, while the nodes 120 generally refer to physically distinct structures (e.g., computing racks) that house the resources 112. Tenants 116 generally refer to users that use a combined, structured group (e.g., subset) of resources 112 in the distributed computing environment 114 for performing various projects or tasks, such as executing a web-based application for use on the Internet. In one aspect, one or more of the tenants 116 may be users that lease, rather than purchase the resources 112 that are used for executing their projects (e.g., applications). Although the term 'tenant' is used herein to describe how the resources 112 of the distributed computing environment 114 may be tagged, it should be appreciated that the resources 112 may be tagged according to any suitable entity, such as an administrator of the system 100 who may use the features of the present disclosure to perform one or more administrative functions on the distributed computing environment 114. Each tenant 116 has a tenant computing device 118 that is used for communicating with the distributed computing environment management computing system 102 for managing the resources used by that tenant. The tenant computing device 118 includes at least one processor that executes instructions stored in at least one memory for performing the various features of the present disclosure described herein.

In general, the resource tagging service 104 maintains an index table 110 that associates each resource 112 used in the distributed computing environment 114 with a tenant that is allocated to use that resource. The resource tagging service 104 functions in real-time to continually update the index table 110 as resources are allocated and de-allocated for use by each tenant 116. In one embodiment, the resource tagging service 104 may perform a discovery process on the distributed computing environment 114 to discover each of the resources 112 in the distributed computing environment 114 and associate each discovered resource with a tenant to whom that resource is allocated.

As shown in FIG. 1B the index table 110 is arranged as a table in which its rows represent tags 122 and its columns represents various characteristics to be associated with each tag 122. Each tag 122 includes a tenant field 124*a* indicating the tenant to whom the resource is allocated, and a project field 124*b* indicating one of multiple projects (e.g., applications) that may be managed by each tenant 116. For example, the resource tagging service 104 may use the project field 124*b* to specify separate projects that may be managed independently of one another by the tenant. Each tag 122 may include characteristic information associated with each resource, such as a location field 124*e* indicating a location in which the resource is located. Each tag 122 may also include performance parameters associated with each resource. For example, the tag 122 may include a compliance level field 124*f*, a memory size field 124*g*, a million instructions per second (MIPS) field 124*h*, an input/output operations per second (IOPS) 124*i*, and a cost field 124*j*. Although each tag 122 includes the fields as described above, it should be understood that each tag may include additional, fewer, or different types of parameters and/or characteristic information that what is described herein without departing from the spirit or scope of the present disclosure.

Although each tag 122 includes various characteristics (e.g., the compliance level field 124*f*, the memory size field 124*g*, the million instructions per second (MIPS) field 124*h*, the input/output operations per second (IOPS) 124*i*, and the cost field 124*j*) associated with that resource, other embodiments contemplate that each tag only includes information that associates its respective resource with the tenant 116 and/or a project managed by the tenant 116 such that the characteristic information is obtained through other components of the system, such as a policy engine and/or the operations management application 106.

Each tag 122 may be formatted according to any suitable protocol. In one embodiment, each tag 122 may include an alpha-numeric, comma delimited string that includes the various fields described above. In another embodiment, the tag 122 includes an XML-formatted object that includes the various fields described above.

The tagging of resources 112 in a distributed computing environment 114 according to each tenant 116 may provide one or more useful benefits. In one case, the tagging of resources may enhance the manner in which resources are managed in the distributed computing environment. For example, administrators of the distributed computing environment 114 desiring to test a new project or certain resources in the distributed computing environment may use the system 100 to allocate a certain quantity and type of resources for execution of that project. The resource tagging service 104 may provide a technique for allocating certain resources 112 for that project such that the resources 112 remain segregated from other resources 112, and may be de-allocated in an efficient, organized manner when the project is completed. This manner of de-allocating resources may further serve to reduce the potential consequence of orphaned resources that otherwise could be used for other projects, and may, in some cases, form a security risk when data or information stored in the orphaned resources is not adequately erased upon completion of the project.

In another case, the tagging of resources may aid in ensuring that one or more compliance criteria are maintained during operation of the project on the distributed computing environment. For example, certain security compliance rules (e.g., PCI or HI PPA) may require that a certain level of physical and/or logical isolation be maintained between a project implemented by a tenant 116 and the resources 112 used by other tenants 116. Use of the tenant-based resource management system may provide easy access to where in the distributed computing environment that each resource is implemented relative to the physical and/or logical proximity of the resources used by other tenants 116.

In another case, the tagging of resources 112 may aid in their migration to different locations, such as from one computing node 120 to another computing node 120, which may each have multiple resources 112 capable of executing the tenant's project. For example, migration of resources 112 may be desired in order to perform periodic maintenance on a particular computing node 120 of the distributed computing environment 114 that is to be powered down for a period of time. In this case, the resource tagging service 104 may perform a reverse lookup procedure on the index table 110 to indicate which tenants 116 occupy the resources 112 on the computing node 120 to be powered down. Using this information, the system 100 may then facilitate migration of the resources 112 to another computing node 120 such that the first computing node 120 may be safely powered down (e.g., taken off line). In some cases, the resource tagging service 104 may also send notification messages to the tenants 116 of those resources 112 warning them of the upcoming downtime that may be experienced.

In yet another case, tagging of the resources 112 may provide for increased reliability by controlling how the resources 112 for a particular project are distributed over multiple computing nodes 120 in the distributed computing environment 114. For example, administrators may, by identifying the resources 112 allocated to a particular tenant 116, migrate certain resources 112 from one computing node 120 to another computing node 120 so that at least some of the resources 112 used by that tenant 116 remain functional in the event that one of the computing nodes 120 experiences a catastrophic failure.

In yet another case, tagging of the resources 112 may provide for visibility into a costing structure associated with each of the resources 112 so that administrators may develop a pricing plan that accurately represents the cost of maintaining those resources. Each tag may include certain performance parameters (e.g., instructions per second (IPS), input/output operations per second (IOPS), memory size, etc.) and other characteristic information (e.g., brand, location, redundancy level, etc.), which is known about its respective resource from which a pricing plan may be developed. For example, while a first node 120 having a relatively stringent compliancy level (e.g., PCI) may be relatively more costly to implement and maintain than a second node 120 that does not provide any specific compliance level, the tag associated with the first node 120 may include a pricing field indicating a relatively higher price than the tag associated with the second node 120 due to this information stored in the tags.

The operations management application 106 manages the operation of the resources 112 of the distributed computing environment 114, which may include, for example, provisioning resources, de-provisioning resources, configuring one or more operational parameters on each resource 112, and the like. Any suitable type of operations management application may be implemented with the teachings of the present disclosure. In one embodiment, the operations management application includes a vSphere™ software suite that is available from VMware Corporation, which is headquartered in Palo Alto, Calif.

The distributed computing environment management computing system 102, the distributed computing environment 114, and the tenant computing devices 118 communicate with one another using a communications network 126. Nevertheless, the distributed computing environment management computing system 102, the distributed computing environment 114, and the tenant computing devices 118 may communicate with one another in any suitable manner. For example, the distributed computing environment management computing system 102, the distributed computing environment 114, and the tenant computing devices 118 may communicate with each other using wireless and/or wired communications. In one embodiment, the distributed computing environment management computing system 102, the distributed computing environment 114, and the tenant computing devices 118 communicates with one another using a communication network 120, such as the Internet, an intranet, or another wired and/or wireless communication network. In another embodiment, the management computing system 102 and converged infrastructure 200 communicate with one another using any suitable protocol or messaging scheme. For example, they may communicate using a Hypertext Transfer Protocol (HTTP), extensible markup language (XML), extensible hypertext markup language (XHTML), or a Wireless Application Protocol (WAP) protocol. Other examples of communication protocols exist. For example, the distributed computing environment management computing system 102, the distributed computing environment 114, and the tenant computing devices 118 may communicate with one another without the use of a separate and a distinct network.

As shown, the distributed computing environment 114 includes multiple computing nodes 120 that each provides multiple resources 112 for use by the distributed computing environment 114. Nevertheless, the distributed computing environment 114 may include any type and number of resources. The resources 112 of the distributed computing environment 114 generally refer to computing devices that perform some function for the overall operation of the distributed computing environment 114. Examples of such computing devices may include, for example, laptop or notebook computers, workstations, personal digital assistants (PDAs), tablet computers, and the like, and/or complex computing structures, such as clusters, unified computing systems, fabric-based computing systems, and dynamic infrastructures. The computing devices may also include other communication devices, such as switches, routers, firewall appliances, or other communication device that facilitates communication among multiple other computing devices. The distributed computing environment 114 may also include distributed computing systems, such as storage arrays, network resource, compute devices, and/or any combination thereof. For example, the computing environment 114 may comprise one or more converged infrastructures configured in a cloud computing environment.

Figure 2A:
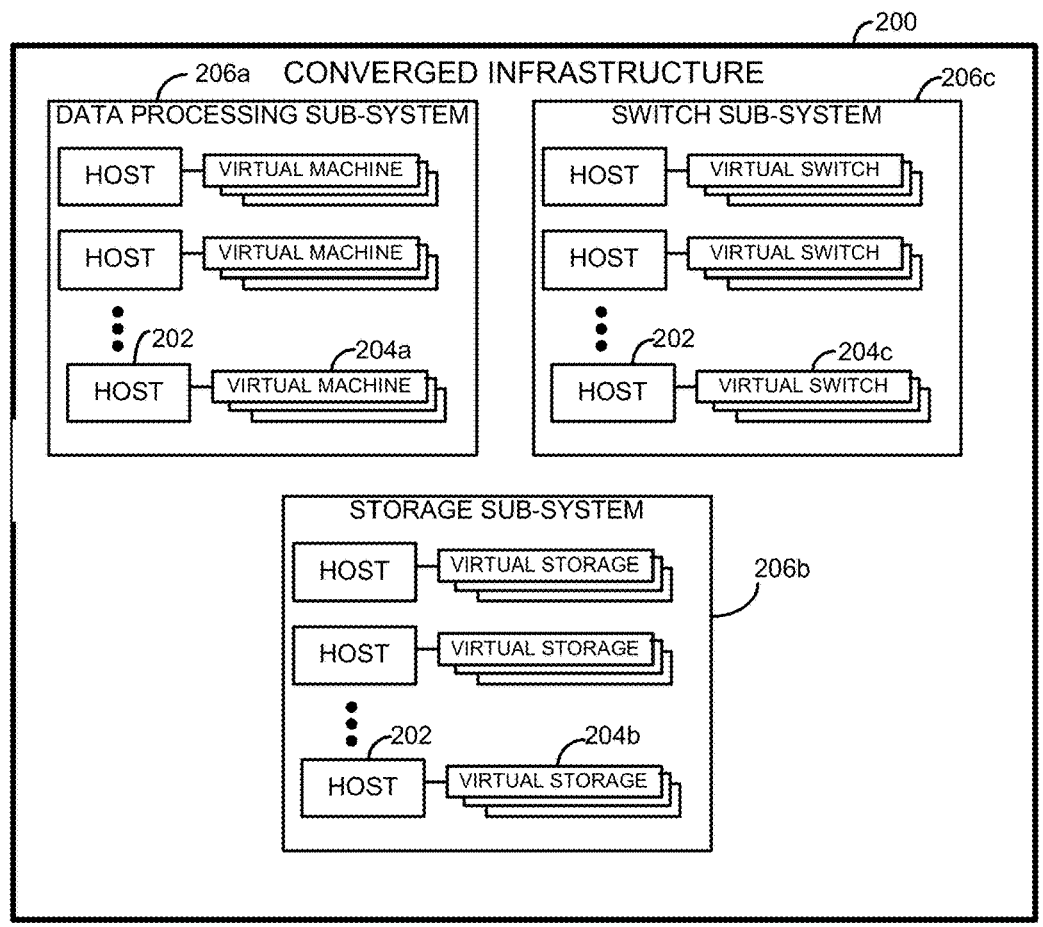
FIGS. 2A and 2B illustrate an example converged infrastructure that may be implemented as a computing node of the distributed computing environment according to one embodiment of the present disclosure.
Figure 2B:
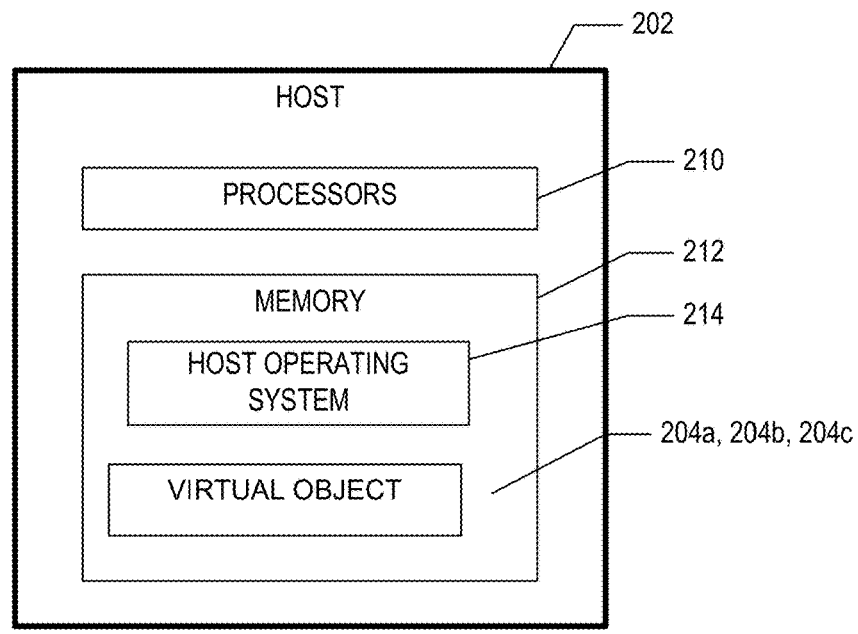

FIGS. 2A and 2B illustrate an example converged infrastructure 200 that may be implemented as one computing node 120 of the distributed computing environment 114 according to the teachings of the present disclosure. For example, multiple converged infrastructures 200 as described herein may be configured to communicate with one another using a communication network, such as the communication network 126 to form at least a portion of the distributed computing environment 114. As another example, a single converged infrastructure 200 comprising a distributed computing environment 114 may be managed by the system 100 to tag resources 112 according to the tenants 116 who use those resources.

The converged infrastructure 200 may be any type having multiple hosts 202 that each executes one or more virtual objects (e.g., virtual machines 204a, virtual storage objects 204b, and virtual switch objects 204c). The hosts of a converged infrastructure are often referred to as compute servers. Nevertheless, in this disclosure, the term 'host' may be interpreted as any physical device and/or component that supports the operation of virtual resources 112 and services provided by those virtual resources. The particular converged infrastructure 200 as shown includes several sub-systems, such as a data processing sub-system 206a, a data storage sub-system 206b, and a switch sub-system 206c. Nevertheless, it should be understood that other converged infrastructures 104 may include additional, fewer, or different types of sub-systems without departing from the spirit and scope of the present disclosure.

In one aspect, each converged infrastructure 200 includes a combination of these sub-systems or other sub-systems that are packaged and interconnected in a standardized manner for ease of maintenance and use. Converged infrastructures such as these are often implemented in environments where relatively high reliability and/or availability are desired, such as in an enterprise environment. Nevertheless, it is contemplated that any converged infrastructure, such as a computer cluster, computing grid, blade array, and/or other converged infrastructure may be managed using the teachings of the present disclosure. For example, a converged infrastructure 200 such as that shown includes components found in Vblock™ System infrastructure packages available from VCE, LLC, which is located in Richardson, Tex.

In one aspect, the data storage sub-system 206b includes computer-readable memory structures for storing data used by the converged infrastructure 200, which may include network attached storage (NAS) arrays and/or storage area network (SAN) arrays that are facilitated by multiple virtual objects (e.g., virtual storage objects 204b). The switch sub-system 206c provides for communication among the various sub-systems of the converged infrastructure 200, and may include components, such as fabric interconnect systems, Ethernet switches/routers, multilayer director switches (MDSs), and the like. The data processing sub-system 206a executes applications that access, store, and otherwise manipulate data stored by the converged infrastructure 200. For a particular example, either of the data storage sub-system 206b, the switch sub-system 206c, and/or the data processing sub-system 206a may comprise a blade computing platform having multiple hosts (e.g., blade computing devices) 106 that each executes one or more virtual objects.

Each sub-system includes multiple hosts 202 that each executes one or more virtual objects, which in this particular example, are virtual machines (VMs) 204a, virtual storage objects 204b, and virtual switch objects 204c. For example, virtual objects, such as the VMs 204a may include software-based operating systems that are emulated on their respective hosts, which are physical computing devices. For each host, its respective VMs may be managed by a hypervisor that provides a virtual architecture for each VM's operation and controls various aspects of their operation. One example of a suitable hypervisor includes the VMware ESX™ software suite that is available from VMware corporation, which is located in Palo Alto, Calif.

FIG. 2B illustrates an example host 202 implemented on each converged infrastructure 200 according to one aspect of the distributed computing environment management system 100. The host 202 is a computing or processing device that includes one or more processors 210 and a memory 212. For example, the host 202 can be a personal computer, such as a laptop or notebook computer, a workstation, or other processing device such as a personal digital assistant or a tablet computer. In a particular embodiment, the host 202 is a rack mounted host, such as blade host in which multiple blade hosts share a common backplane for communication with one another and for receiving power from a rack mounted power distribution unit. The memory 212 stores a host operating system 214 and one or more virtual objects (e.g., VMs 204a, virtual storage objects 204b, and virtual switch objects 204c) that are executed by the processor 210.

The host operating system 212 controls and manages the operation of the virtual objects executed on the host 202. For example, control signaling for starting, stopping, and/or changing operating parameters of each virtual object is managed through the host operating system 212.

Figure 3:
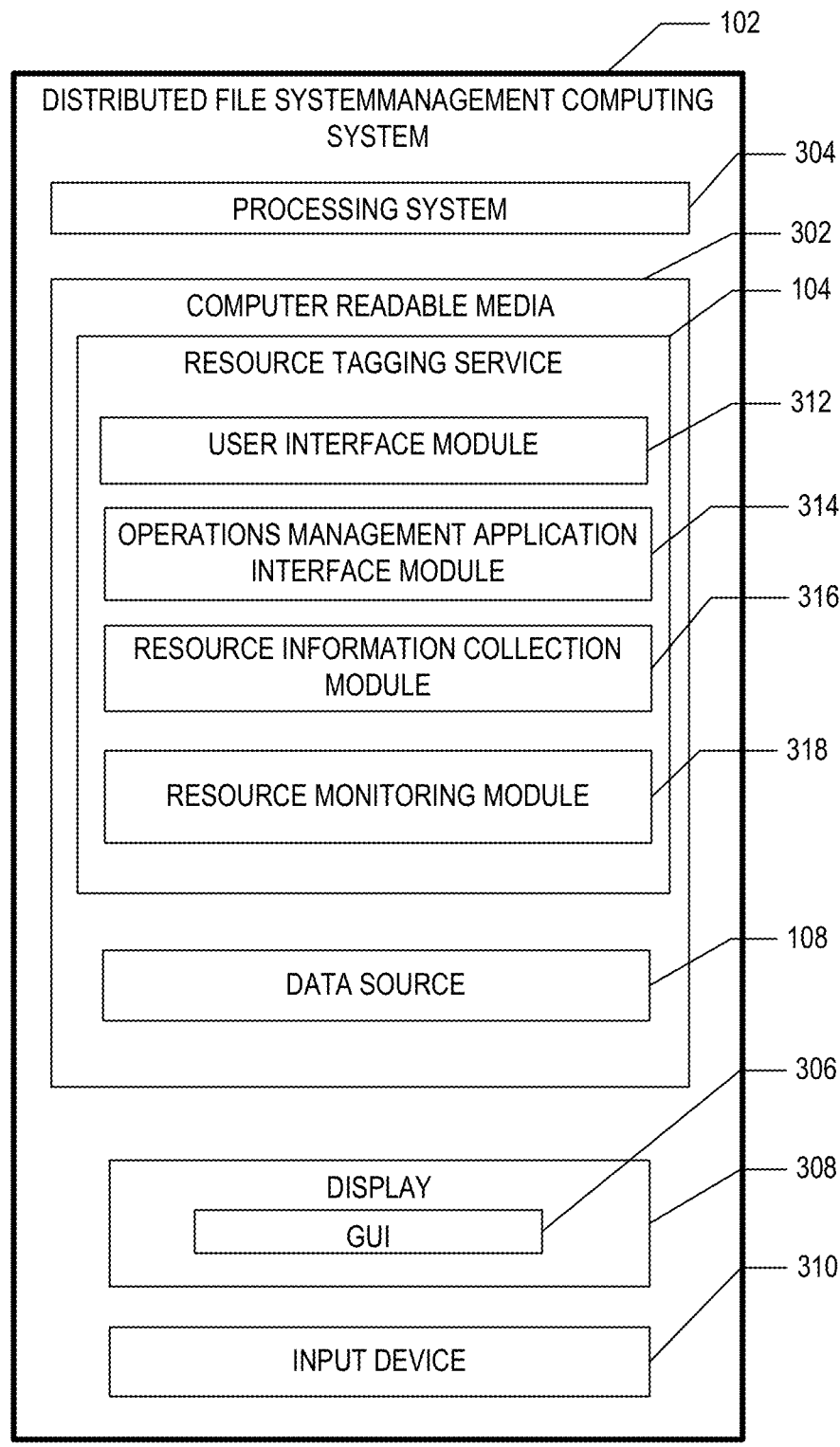
FIG. 3 illustrates a block diagram of an example resource tagging service executed on the distributed computing environment management computing system according to one embodiment of the present disclosure.

Referring now in more detail to FIG. 3, a block diagram of an example resource tagging service 104 executed on the distributed computing environment management computing system 102, is depicted according to one aspect of the present disclosure. The resource tagging service 104 is stored in a computer readable media 302 and executed on a processing system 304 of the management computing system 102. The management computing system 102 may include any type of computing system, such as one or more management computing systems, personal computers, mobile computers and/or other mobile devices, and other hosts.

According to one aspect, the distributed computing environment management computing system 102 also includes a graphical user interface (GUI) 306 displayed on the display 308, such as a computer monitor, for displaying data. The distributed computing environment management computing system 102 also includes an input device 310, such as a keyboard or a pointing device (e.g., a mouse, trackball, pen, or touch screen) to enter data into or interact with the GUI 306. According to one aspect, the resource tagging service 104 includes instructions or modules that are executable by the processing system 304 as will be described in detail herein below.

The computer readable media 302 includes volatile media, nonvolatile media, removable media, non-removable media, and/or another available medium. By way of example and not limitation, non-transitory computer readable medium comprises computer storage media, such as non-transient storage memory, volatile media, nonvolatile media, removable media, and/or non-removable media implemented in a method or technology for storage of information, such as computer readable instructions, data structures, program modules, or other data.

A user interface module 312 communicates with the tenant computing device 118 or the GUI 306 to facilitate receipt of input data and/or output data from or to a tenant 116 or other user (e.g., an administrator of the system 100), respectively. The user interface module 312 may display information to, and receive user information from the tenant 116 in any suitable form, such as via a graphical user interface (GUI) or a command line interface (CLI). For example, the user interface module 312 may display a list of the tags 122 on a display of the tenant computing device 118 for management of the resources 112 allocated to that tenant 116 for various reasons, such as selection of certain resources 112 for executing the tenant's application, monitoring the performance of the resources 112 allocated to the tenant 116, and the like. As another example, the user interface module 312 may display one or more selectable fields, editing screens, and the like for receiving the configuration information from the user (e.g., an administrator) for managing operation of the system.

An operations management application interface module 314 provides an interface to the operations management application 106 for transmitting and receiving information about the distributed computing environment 114, tenants 116, and/or other information associated with operation of the system. For example, the operations management application interface module 314 may communicate with the operations management application 106 to receive resource information including which tenant 116 that the resource is allocated to and/or to provide tag information to the operations management application 106 so that users of the operations management application 106 may manage operation of the distributed computing environment 114 using tenant-based information provided by the index table 110.

A resource information collection module 316 collects information about the resources 112 for use by the system 100. For example, the resource information collection module 316 may communicate with the operations management application 106 to receive resource information including tenant information as well as any performance information and/or characteristic information associated with each resource 112. As another example, the resource information collection module 316 may perform a discovery process to populate the index table 110 with tags 122 from a newly deployed distributed computing environment 114 or an existing distributed computing environment 114 that has yet to be configured for management by the resource tagging service 104.

A resource monitoring module 318 updates the tags 122 associated with each resource to maintain the index table in an up-to-date condition on an ongoing basis. For example, the resource monitoring module 318 may communicate with the operations management application 106 to receive update information about each resource when it changes, and in response, updates the tag 122 associated with that resource in the index table 110. For example, when the operations management application 106 modifies the configuration and/or parameters associated with a particular resource, it may also transmit a notification message to the resource monitoring module 318 that in turn, updates the tag associated with the resource to reflect the modifications.

In one embodiment, the resource monitoring module 318 may compare any received notification messages against certain compliance rules and update the compliance level of that resource in addition to other resources 112 that may be affected by the changed resource. For a particular example in which one compliance rule specifies that at most three tenants 116 may share a network resource on one computing node 120, if a notification message is received indicating that a fourth tenant 116 has been allocated to use that network resource, resource monitoring module 318 may then update the compliance information associated with that resource to indicate that the resource is no longer compliant with that particular compliance rule.

Although the resource information collection module 316 and/or resource monitoring module 318 as described above receives resource information via the operations management application 106, other embodiments of the resource information collection module 316 and/or resource monitoring module 318 may receive resource information from other sources, such as the resources themselves. For example, the resource information collection module 316 and/or resource monitoring module 318 may communicate with each resource using application program interfaces (APIs) configured on each resource, which may be accessed by the resource information collection module 316 and/or resource monitoring module 318 to update the tag 122 associated with that resource. The resource information collection module 316 and/or resource monitoring module 318 may also receive status information from each resource for monitoring its various operational aspects, such as its configuration, operational status, system alarm conditions, and the like.

It should be appreciated that the modules described herein are provided only as examples, and that the resource tagging service 104 may have different modules, additional modules, or fewer modules than those described herein. For example, one or more modules as described in FIG. 3 may be combined into a single module. As another example, certain modules described herein may be encoded on, and executed on other computing systems, such as on one of the hosts 202 of a converged infrastructure 200 as described above with reference to FIGS. 2A and 2B.

Figure 4A:
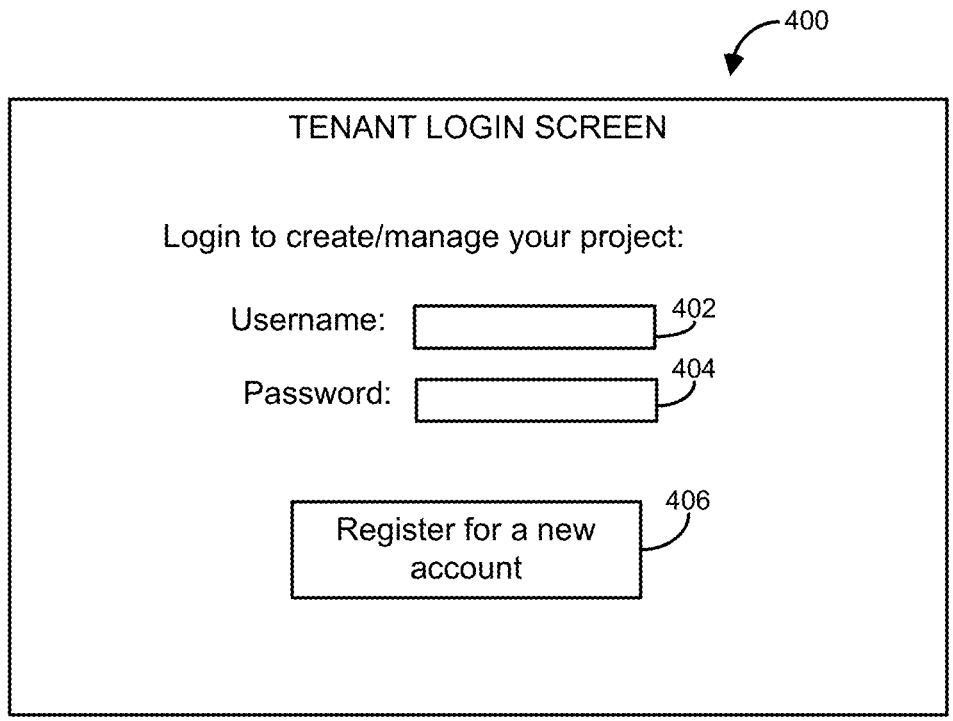
FIGS. 4A through 4C illustrate example screenshots that may be displayed by the resource tagging service for receiving input from a tenant in order to manage the resources used by that tenant according to one embodiment of the present disclosure.
Figure 4B:
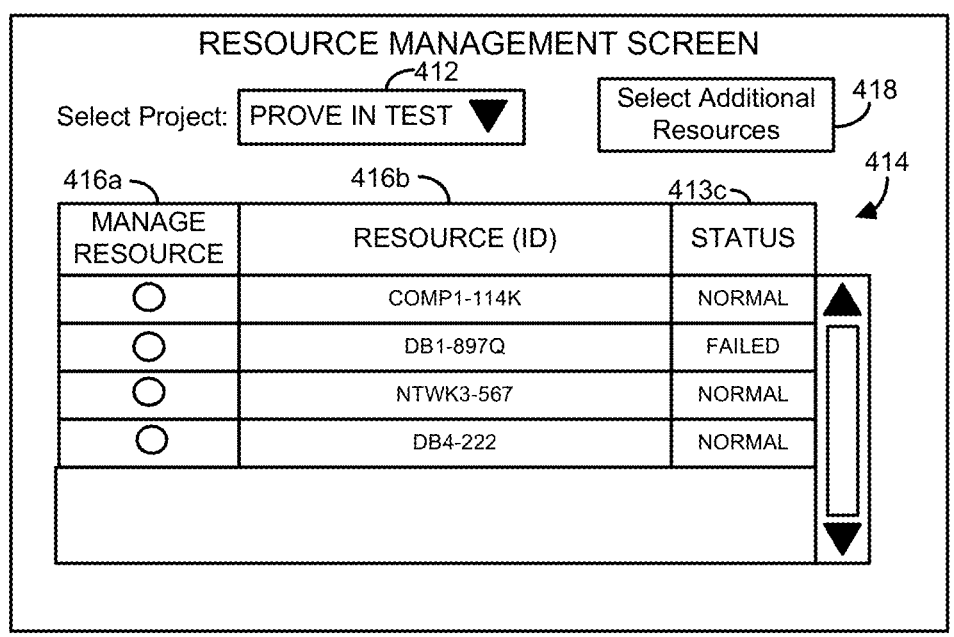
Figure 4C:
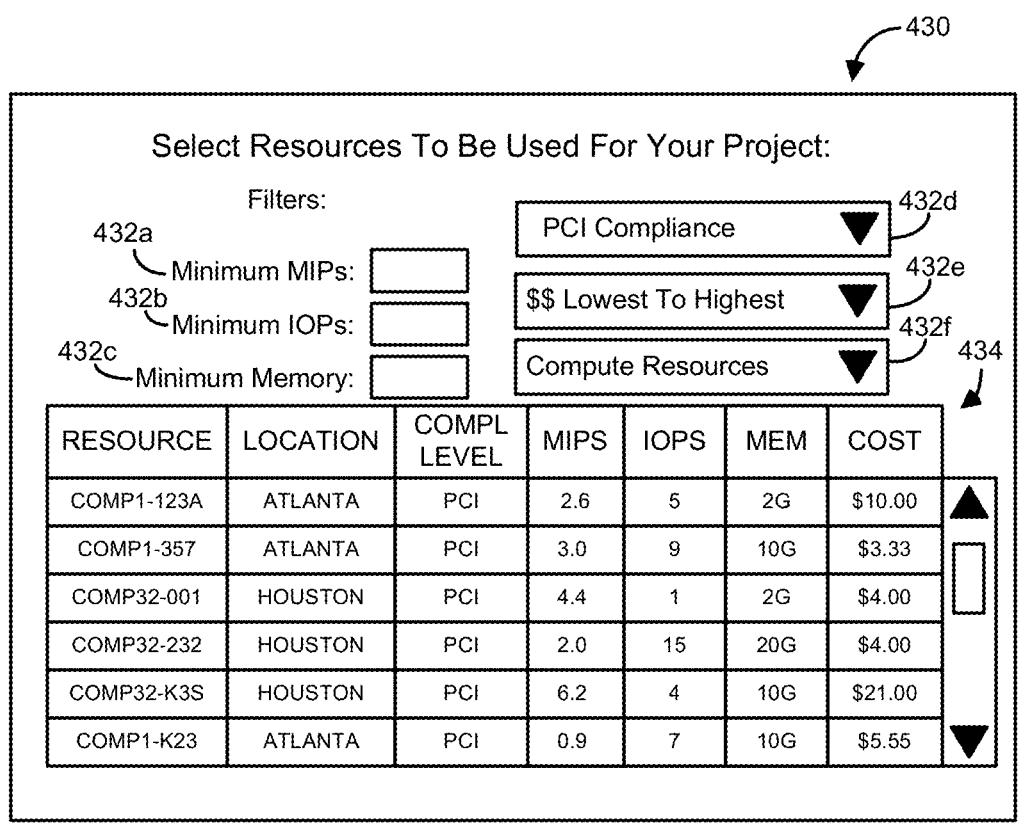

FIGS. 4A through 4C illustrate example screenshots that may be displayed by the resource tagging service 104 for receiving input from a tenant 116 in order to manage the resources 112 used by that tenant 116 according to one embodiment of the present disclosure. In general, FIG. 4A is a tenant login screen 400 that is used to receive passcode information from the tenant 116 for establishing a login session with the tenant 116, FIG. 4B illustrates a resource management screen 410 for managing resources 112 allocated to a tenant 116, and FIG. 4C illustrates a resource filtering and selection screen 430 that provides for tenant 116 selection of certain resources meeting desired criteria for executing their project.

Referring initially to FIG. 4A, the tenant login screen 400 includes a username field 402 and a password field 404 for entry of a username and password, respectively, for an account associated with a tenant 116. The login session provides for authentication of the tenant 116 to mitigate the possibility for any illicit use of the resources 112 that may be allocated for the tenant 116 and/or for one or more projects (e.g., applications) used by the tenant 116. Although a username/password combination is described herein for establishing a login session, it should be understood that the tenant login screen may use any suitable authentication mechanism. For example, the tenant login screen 400 may communicate with the tenant computing device 118 to receive biometric scan data, such as fingerprint data obtained from a fingerprint scan device to authenticate the user for establishing the login session. The tenant login screen 400 also includes a registration button 406 that when selected causes the resource tagging service 104 to generate one or more other screens for registering an account with the tenant 116.

Once the tenant 116 has been authenticated, the resource management screen 410 (FIG. 4B) may be displayed that facilitates the management of resources 112 to be used by one or more projects associated with the tenant 116. The resource management screen 410 may include a project identity (ID) pop-down menu 412 and a resource list 414. The project ID pop-down menu 412 allows the tenant 116 to select from among multiple projects established for use by that tenant 116. Also, the project ID pop-down menu 412 may provide for establishing a new project for the tenant 116. The resource list 414 includes list of the resources 112 that are associated with the selected project.

The resource list 414 includes a resource management column 416a, a resource ID column 416b, and a status column 416c. The resource ID column 416b includes an identification (e.g., name) of each resource allocated to the selected project, while the status column 416c includes status information associated with its respective resource, such as whether the resource is in a normal or a failed state. In one embodiment, the status column 416c indicates for each resource, whether its respective resource meets the criteria specified for that resource according to any filtering rules which may have been specified by the tenant 116. For example, the filtering rules, which may have been saved from a previous login session, may be imported and applied against the resources 112 allocated for that project such that those allocated resources 112 that do not meet the criteria specified by the tenant 116 may be indicated with an alert message, such as a blinking red light in the status column 416c associated with that non-compliant resource. Nevertheless, it should be appreciated that any suitable type of alert message may be used to indicate non-compliance of each resource according to any rules specified by the tenant 116.

The resource management column 416a provides for modifying each allocated resource shown in the resource list 414. For example, if a radio button associated with a particular resource is selected by the tenant 116, one or more other screens (e.g., the resource filtering and selection screen of FIG. 4C) may be generated to facilitate configuration changes to that resource. The resource management screen 420 also includes a 'select additional resources' button 418 that when selected by the user, generates the resource filtering and selection screen 430 for receiving selection of additional resources 112 to be allocated to the project.

The resource filtering and selection screen 430 as shown in FIG. 4C includes one or more filtering fields 432, and an available resource list 434. The resource list 434 displays any currently unallocated resources 112 that may be allocated for use by the tenant's project based upon filtering rules entered through the filtering fields 432.

The filtering rules fields 432 provide for user input of various rules to be applied to the gamut of available resources 112 in the distributed computing environment 114. For example, the filtering rule fields include a minimum MIPS field 432a, a minimum IOPS field 432b, a minimum amount of memory field 432c, a compliance level entry field 432d, a relative cost field 432e, and a computing node selection field 432f. The minimum MIPS field 432a, minimum IOPS field 432b, minimum amount of memory field 432c specify the minimum MIPS, IOPS, and an amount of memory, respectively, to be provided by each resource. The compliance level entry field 432d specifies a minimum compliance level (e.g., PCI or HI PPA) to be maintained by each resource, while the relative cost selection field 432e displays the cost to be applied to each available resource. For example, the relative cost selection field 432e may be selected to order the listing of the resources from lowest to highest cost, or to order the listing of the resources from the highest to lowest cost.

The computing node selection field 432f specifies that only those resources available from a particular computing node 120 be listed. In one embodiment, the filtering rule fields 432 include rules associated with those recorded and maintained in the index table 110 that are stored in the data source 108. As each of the filtering rule fields 432 are manipulated by the tenant 116, the resource list 434 may grow, shrink, or change based upon which resources 112 meet the rules entered by the tenant 116. For example, if the tenant 116 selects a particular computing node 120 from the computing node selection field 432f, and enters a value of 10 Giga-bytes in the minimum memory entry field 432c, the resource tagging service 104 may, using the index table 110, filter the available set of resources from that particular computing node 120 having at least the specified minimum amount of memory and populate the resource list 434 with those filtered resources 112. From the filtered list, the tenant 116 may then select one or more resources 112 to be allocated for use with that project.

Although FIGS. 4A through 4C illustrate example entry screens that may be used for managing resources by a tenant 116 or other user, the system 100 may include additional, fewer, or different entry screens without departing from the spirit and scope of the present disclosure. For example, the system may include one or more other screens for facilitating management of individual resources allocated for use by the tenant 116, such as one that provides for configuration of certain parameters (e.g., allocated memory, quantity of processors, configuration of any ports, etc.).

Figure 5:
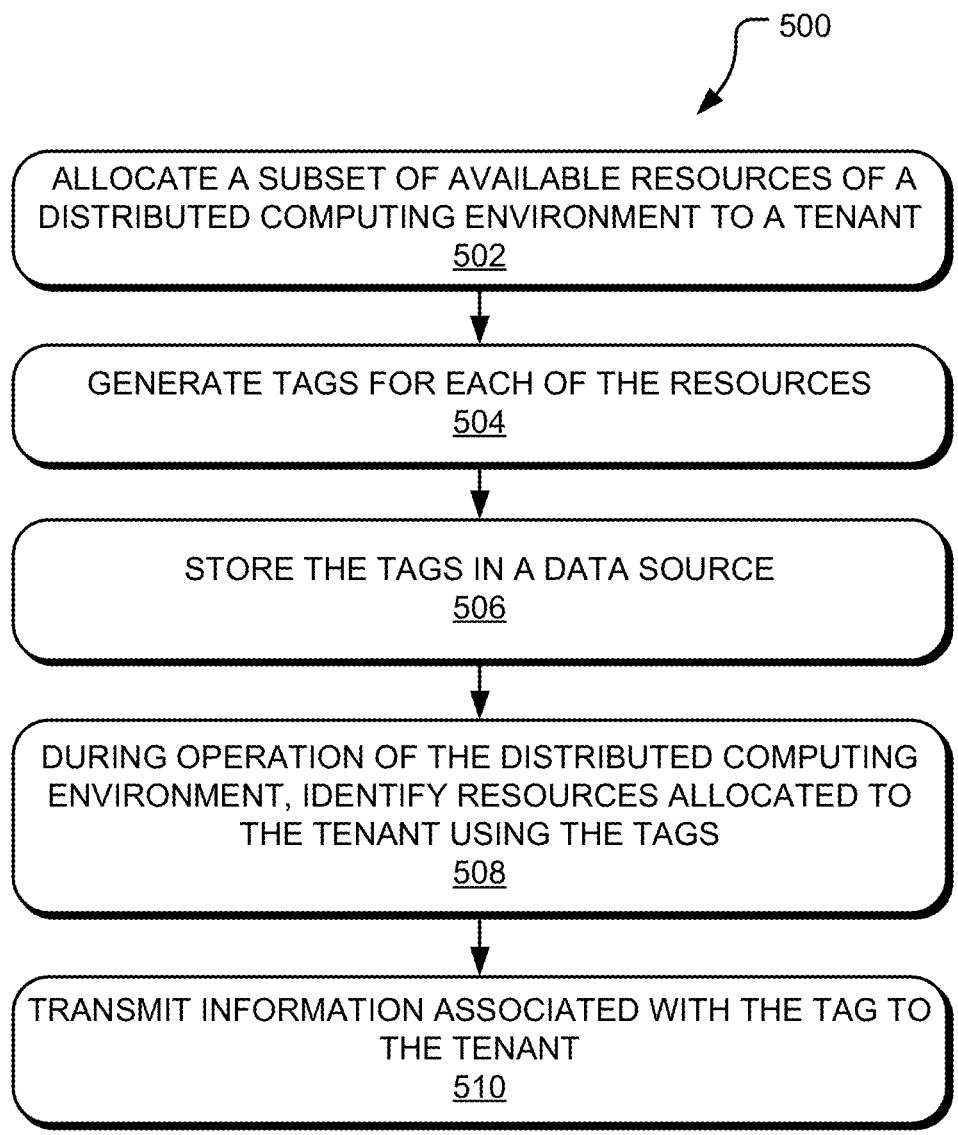
FIG. 5 illustrates an example process that is performed by the system to manage resources of a distributed computing environment according to a tenant to whom the resources are allocated according to one embodiment of the present disclosure.

FIG. 5 illustrates an example process 500 that is performed by the system 100 to manage resources of a distributed computing environment according to a tenant 116 to whom the resources are allocated according to one embodiment of the present disclosure.

In step 502, the system 100 allocates a subset of the available resources of a distributed computing environment to a tenant 116. For example, the resources may communicate with an operations management application 106 to receive information about the resources in the distributed computing environment 114 and transmit instructions for manipulating the operation of the resources of the distributed computing environment for allocating certain resources to the tenant 116.

In step 504, the system 100 generates tags for the subset of allocated resources in which each tag includes information associated with the tenant 116. In one embodiment, the system may perform a discovery process on a distributed computing environment 114 that has been previously deployed with a number of tenants 116. In this case, the system may obtain tenant information for each resource, such as from one or more external data sources (e.g., tenant manifest files, resource configuration files, etc.) where the tenant information is stored. In another embodiment, each resource may include multiple tags associated with multiple tenants 116 that use the resource, such as shared resources (e.g., routers or load balancers, etc.). In yet another embodiment, each tag may include information associated with one of multiple projects (e.g., sub-tasks) managed by a tenant 116.

In step 506, the system 100 stores the generated tag in the data source 108. In one embodiment, the tags may be stored in an index table in which each tag (e.g., record of the index table) includes a delimited alpha-numeric string of characters that may include one or more parameters associated with its resource. In other embodiments, each tag may include a record formatted according to an XML format.

In step 508, the system 100 identifies the resources allocated to the tenant 116 using the stored tags during operation of the distributed computing environment. The identified resources may be used for any purpose, such as verification that the resources allocated for executing a particular project (e.g., application) are compliant with a particular security compliance level (e.g., PCI/HIPPA), migration of certain resources from one computing node 120 to another computing node 120, selection of certain resources according to a pricing structure established for each of the resources, removing orphaned resources that are no longer allocated to any tenant 116, and the like.

In step 510, the system 100 transmits the identified resources to the computing device of the tenant 116. In other embodiments, the system 100 may transmit the identified resources to other users, such as the GUI 306 for use by administers of the system 100.

The previous steps may be repeatedly performed for continual storage and access to the stored of additional data blocks by the system 100. Nevertheless, when use of the storage access service 106 is no longer needed or desired, the process ends.

Although FIG. 5 describes one example of a process that may be performed by the system for managing resources according to the tenants 116 to whom the resources are allocated, the features of the disclosed process may be embodied in other specific forms without deviating from the spirit and scope of the present disclosure. For example, the system 100 may perform additional, fewer, or different operations than those operations as described in the present example. As another example, the steps of the process described herein may be performed by a computing system other than the computing system 102, which may be, for example, one of the virtual objects executed on the virtual computing environment.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Figure 6:
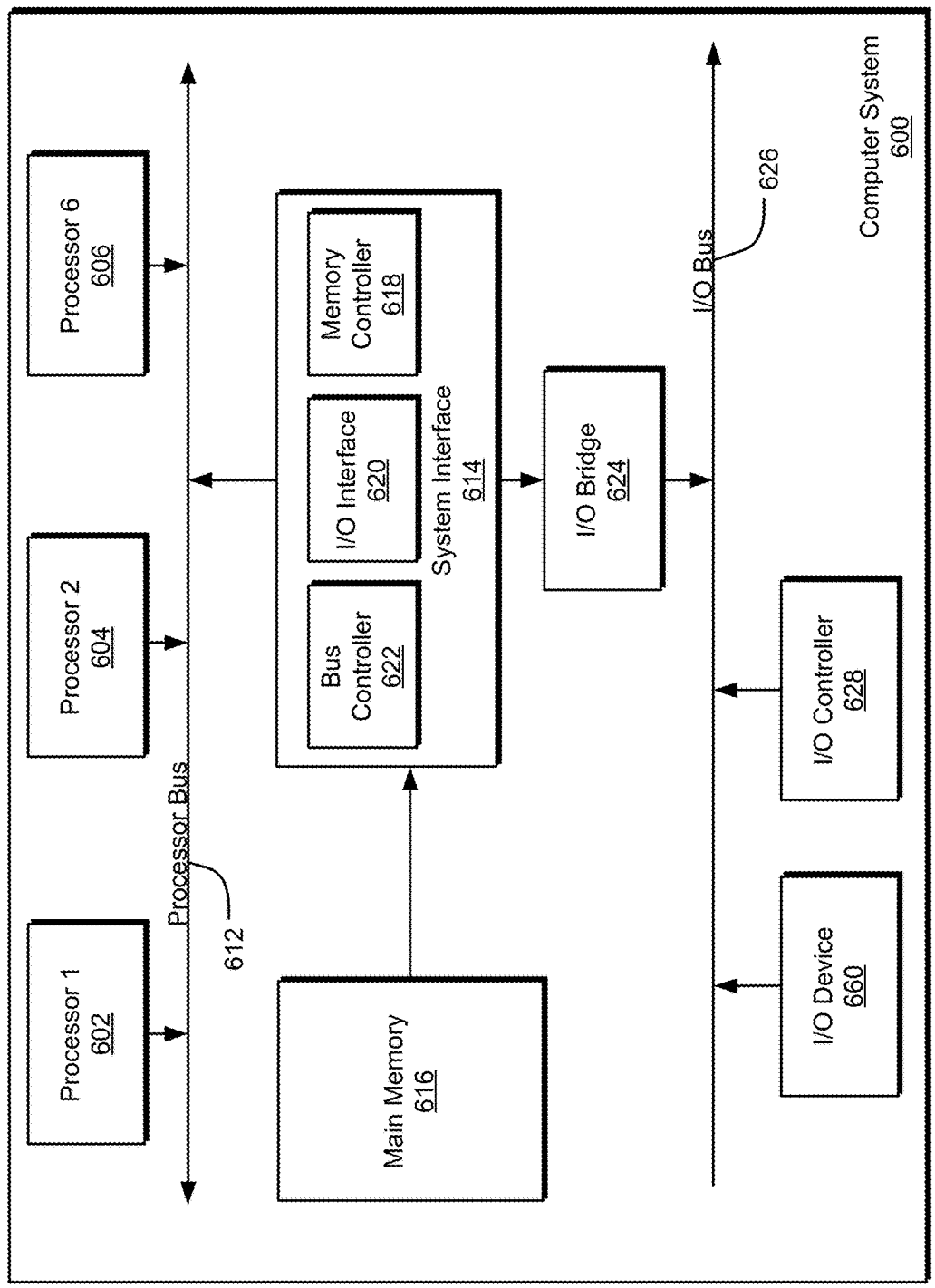
FIG. 6 illustrates an example computer system according to one embodiment of the present disclosure.

For example, FIG. 6 is a block diagram illustrating an example of a host or computer system 600 which may be used in implementing the embodiments of the present disclosure. The computer system (system) includes one or more processors 602-606. Processors 602-606 may include one or more internal levels of cache (not shown) and a bus controller or bus interface unit to direct interaction with the processor bus 612. Processor bus 612, also known as the host bus or the front side bus, may be used to couple the processors 602-606 with the system interface 614. System interface 614 may be connected to the processor bus 612 to interface other components of the system 600 with the processor bus 612. For example, system interface 614 may include a memory controller 613 for interfacing a main memory 616 with the processor bus 612. The main memory 616 typically includes one or more memory cards and a control circuit (not shown). System interface 614 may also include an input/output (I/O) interface 620 to interface one or more I/O bridges or I/O devices with the processor bus 612. One or more I/O controllers and/or I/O devices may be connected with the I/O bus 626, such as I/O controller 628 and I/O device 630, as illustrated.

I/O device 630 may also include an input device (not shown), such as an alphanumeric input device, including alphanumeric and other keys for communicating information and/or command selections to the processors 602-606. Another type of user input device includes cursor control, such as a mouse, a trackball, or cursor direction keys for communicating direction information and command selections to the processors 602-606 and for controlling cursor movement on the display device.

System 600 may include a dynamic storage device, referred to as main memory 616, or a random access memory (RAM) or other computer-readable devices coupled to the processor bus 612 for storing information and instructions to be executed by the processors 602-606. Main memory 616 also may be used for storing temporary variables or other intermediate information during execution of instructions by the processors 602-606. System 600 may include a read only memory (ROM) and/or other static storage device coupled to the processor bus 612 for storing static information and instructions for the processors 602-606. The system set forth in FIG. 6 is but one possible example of a computer system that may employ or be configured in accordance with aspects of the present disclosure.

According to one embodiment, the above techniques may be performed by computer system 600 in response to processor 604 executing one or more sequences of one or more instructions contained in main memory 616. These instructions may be read into main memory 616 from another machine-readable medium, such as a storage device. Execution of the sequences of instructions contained in main memory 616 may cause processors 602-606 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 616. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various operations or steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for provisioning components of a distributed computing environment, the method comprising:
   generating, by a processor, a plurality of tags for a plurality of resources, each tag associated with a resource and including performance parameters associated with the resource, the performance parameters comprising at least one of a compliance level, a memory size, a million instructions per second (MIPS), an input/output operations per second (IOPS), a cost, and a tenant identification;
   identifying, by the processor, a first subset of resources of the plurality of resources, the first subset of resources eligible to perform a computational task;
   identifying, by the processor, a second subset of resources of the plurality of resources, the second subset of resources eligible to perform the same computational task as the first subset of resources is eligible to perform, wherein the second subset of resources is associated with different performance parameters than the first subset of resources;
   selecting, by the processor, one of the first subset of resources and the second subset of resources, the selected subset of resources associated with tags each including performance parameters meeting a specified criteria for executing the task; and
   executing, by the processor, the task using the selected subset of resources.

2. The method of claim 1, wherein the tenant identification is associated with a tenant having access to the resource.

3. The method of claim 2, wherein the specified criteria comprises a specified compliance level.

4. The method of claim 2, wherein the specified criteria comprises a specified cost.

5. The method of claim 1, further comprising segregating, by the processor and based at least in part on the plurality of tags, the first subset of resources from the second subset of resources.

6. The method of claim 1, further comprising migrating, by the processor, a portion of the plurality of resources from a first computing node to a second computing node, the portion of the plurality of resources based at least in part on the plurality of tags.

7. A system for provisioning components of a distributed computing environment, the system comprising:
   a computer system in communication with a distributed computing environment comprising a plurality of computing resources, the computer system comprising at least one hardware processor and at least one memory to store instructions that, when executed by the processor, cause the computer system to perform:
      generating a plurality of tags for a plurality of resources, each tag associated with a resource and including performance parameters associated with the resource, the performance parameters comprising at least one of a compliance level, a memory size, a million instructions per second (MIPS), an input/output operations per second (IOPS), a cost, and a tenant identification;
      identifying a first subset of resources of the plurality of resource, the first subset of resources eligible to perform a computational task;
      identifying a second subset of resources of the plurality of resources, the second subset of resources eligible to perform the same computational task as the first subset of resources is eligible to perform, wherein the second subset of resources is associated with different performance parameters than the first subset of resources;
      selecting one of the first subset of resources and the second subset of resources, the selected subset of resources associated with tags each including performance parameters meeting a specified criteria for executing the task; and
      executing the task using the selected subset of resources.

8. The system of claim 7, wherein the tenant identification is associated with a tenant having access to the resource.

9. The system of claim 8, wherein the specified criteria comprises a specified compliance level.

10. The system of claim 7, wherein the instructions, when executed by the processor, cause the computer system to further perform segregating the first subset of resources from the second subset of resources based at least in part on the plurality of tags.

11. The system of claim 7, wherein the instructions, when executed by the processor, cause the computer system to further perform migrating a portion of the plurality of resources from a first computing node to a second computing node, the portion of the plurality of resources based at least in part on the plurality of tags.

12. The system of claim 7, wherein the instructions, when executed by the processor, cause the computer system to further perform identifying one or more tenants to whom a portion of the plurality of resources are allocated.

13. The system of claim 7, wherein the instructions, when executed by the processor, cause the computer system to further perform a discovery process to generate the plurality of tags.

14. A non-transitory, computer readable medium comprising instructions that, when executed by at least one processor, cause the processor to perform the following:
   generate a plurality of tags for a plurality of resources, each tag associated with a resource and including performance parameters associated with the resource, the performance parameters comprising at least one of a compliance level, a memory size, a million instructions per second (MIPS), an input/output operations per second (IOPS), a cost, and a tenant identification;
   identify a first subset of resources of the plurality of resources, the first subset of resources eligible to perform a computational task;
   identify a second subset of resources of the plurality of resources, the second subset of resources eligible to perform the same computational task as the first subset of resources is eligible to perform, wherein the second subset of resources is associated with different performance parameters than the first subset of resources;
   select one of the first subset of resources and the second subset of resources, the selected subset of resources associated with tags each including performance parameters meeting a specified criteria for executing the task; and execute the task using the selected subset of resources.

15. The non-transitory, computer readable medium of claim 14, wherein the tenant identification is associated with a tenant having access to the resource.

16. The non-transitory, computer readable medium of claim 14, further comprising instructions that, when executed by at least one processor, cause the processor to segregate the first subset of resources from the second subset of resources based at least in part on the plurality of tags.

17. The non-transitory, computer readable medium of claim 15, wherein the performance criteria comprises a specified compliance level.

18. The non-transitory, computer readable medium of claim 14, further comprising instructions that, when executed by at least one processor, cause the processor to migrate a portion of the plurality of resources from a first computing node to a second computing node, the portion of the plurality of resources based at least in part on the plurality of tags.

19. The non-transitory, computer readable medium of claim 14, further comprising instructions that, when executed by at least one processor, cause the processor to identify one or more tenants to whom a portion of the plurality of resources are allocated.

20. The non-transitory, computer readable medium of claim 14, further comprising instructions that, when executed by at least one processor, cause the processor to perform a discovery process to generate the plurality of tags.

\* \* \* \* \*